UNITED STATES PATENT OFFICE.

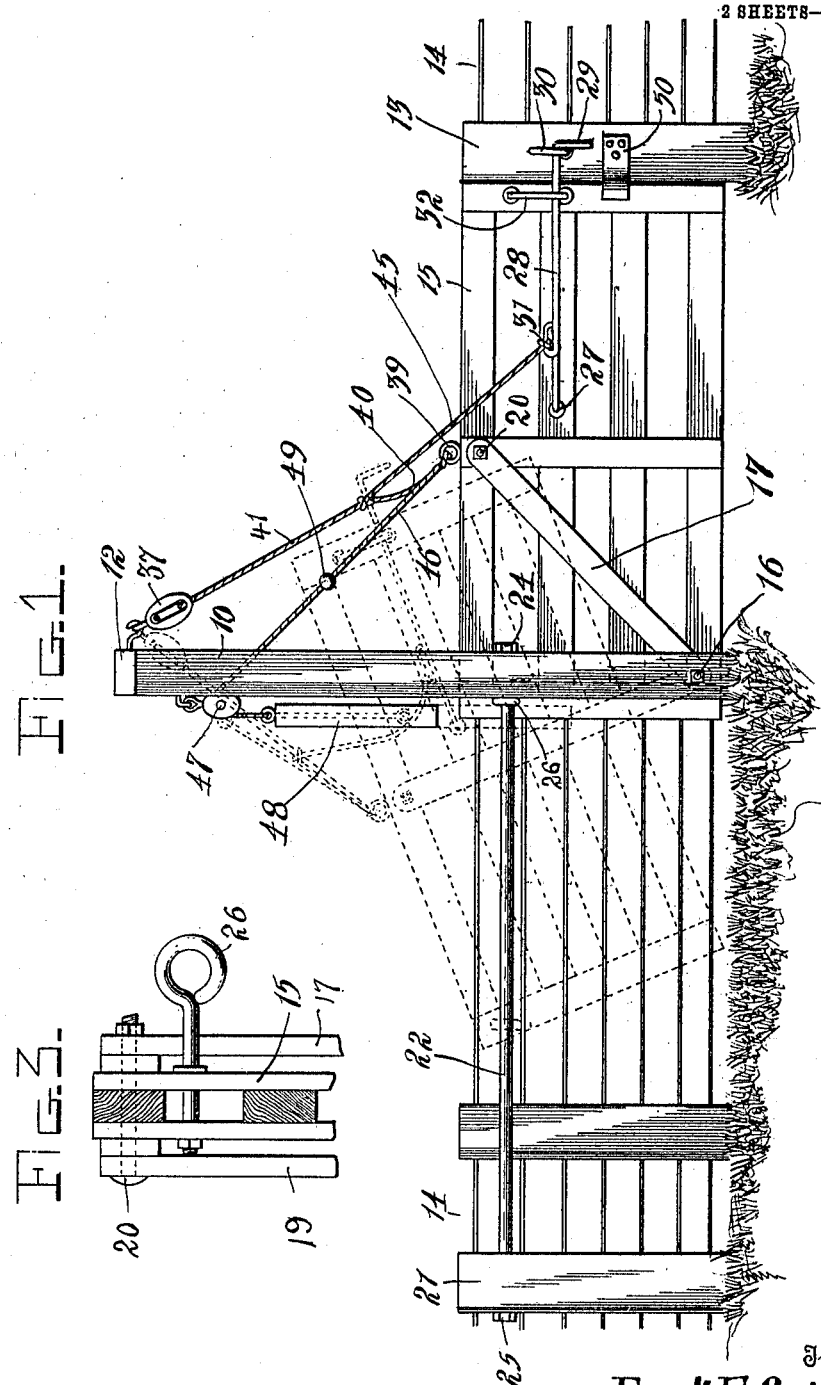

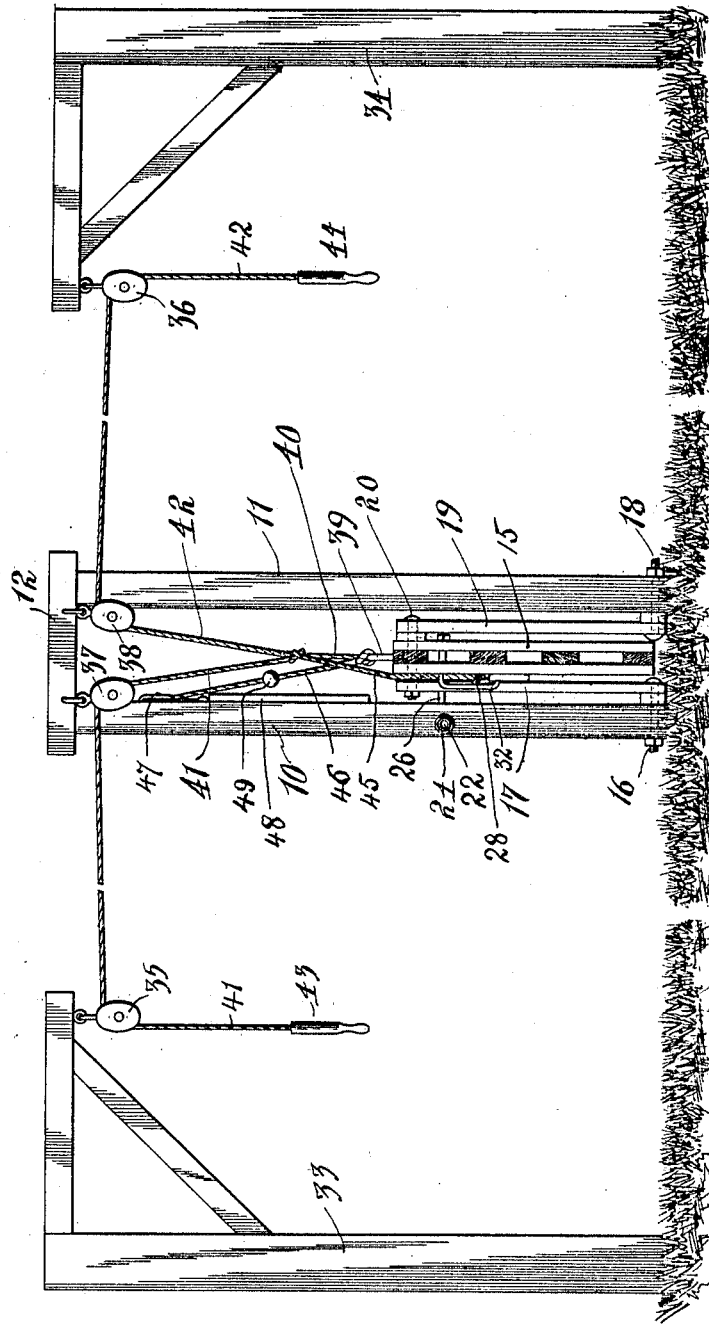

FRANK E. QUIGLE, OF WINGATE, INDIANA.

GATE.

945,418.  Specification of Letters Patent.  Patented Jan. 4, 1910.

Application filed September 7, 1909. Serial No. 516,408.

*To all whom it may concern:*

Be it known that I, FRANK E. QUIGLE, a citizen of the United States, residing at Wingate, in the county of Montgomery, State of Indiana, have invented certain new and useful Improvements in Gates; and I do hereby declare the following to be a full, clear, and exact description of the invention, such as will enable others skilled in the art to which it appertains to make and use the same.

This invention relates to gates, more particularly to farm gates wherein provision is made for opening and closing the gates from a distance, so that a person riding in a vehicle or upon horse back may open and close the gate without alighting, and has for one of its objects to improve the construction and increase the efficiency and utility of devices of this character.

Figure 1:
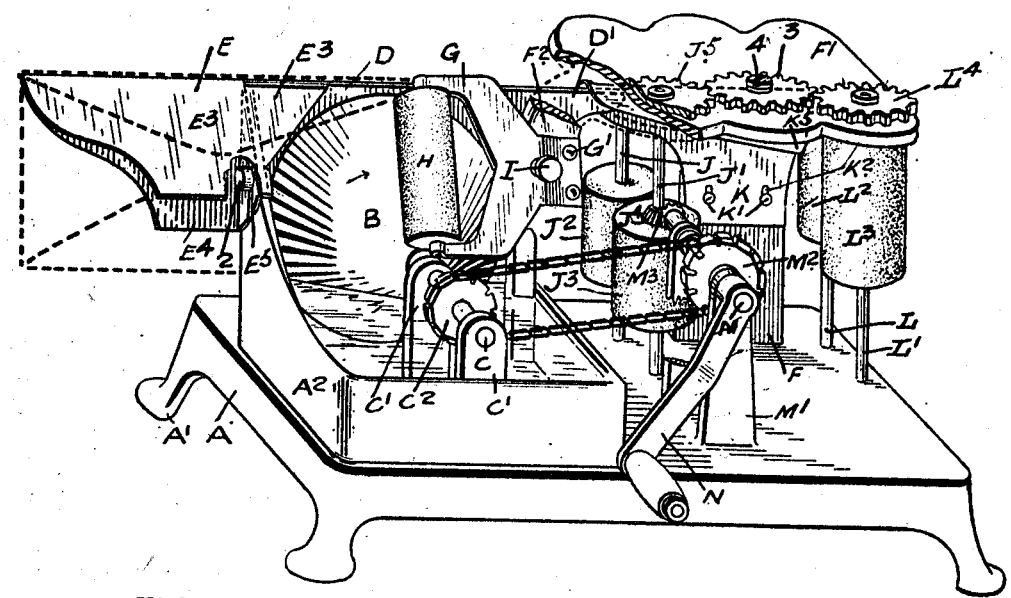
Figure 2:
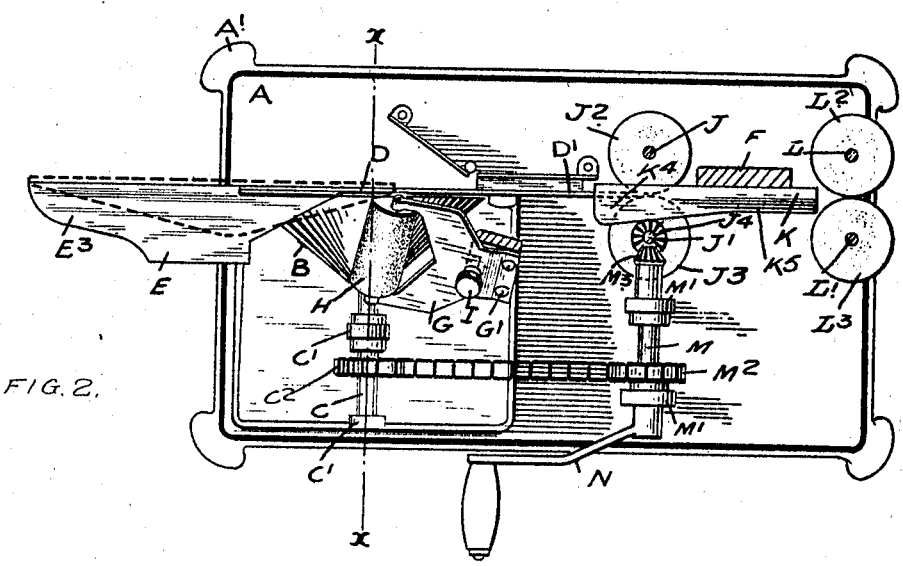

With this and other objects in view, the invention consists in certain novel features of construction as hereafter shown and described and then specifically pointed out in the claim, and in the drawings illustrative of the preferred embodiment of the invention, Figure 1 is a side elevation of the improved device with the gate shown in full lines in closed position and in dotted lines partly elevated, to illustrate the operation. Fig. 2 is an end elevation of the gate and side views of the gate supporting and operating structures. Fig. 3 is a sectional detail, enlarged, of the guide device of the gate.

The improved device comprises in general two spaced vertical posts 10—11 erected at one side of the gateway opening and connected at their upper ends by a transverse member 12. At the opposite side of the gateway opening another post 13 is erected. The fence structure is connected respectively to the post 11 and 13 and is represented conventionally at 14.

The gate, which is represented conventionally at 15, may be of any suitable structure, but for the purpose of illustration an ordinary gate is shown, and is arranged to operate between the posts 10—11. When in closed position one end of the gate bears against the post 13 while the opposite end of the gate remains between the posts 10—11, as shown in full lines in Fig. 1. Pivoted at 16 to the post 10 near its lower end is a radius bar 17, and likewise pivoted at 18 to the post 11 near its lower end is another radius bar 19. The two bars 17—19 are pivoted at their upper ends at 20 to the gate 15, preferably at the upper edge of the latter, as shown.

Located beyond the post 10 is another post 21, the post 21 being spaced from the posts 10—11 a distance equal to the "throw" or movement of the gate when in open position. Connected through the posts 10—21 is a guide rail 22, preferably formed from a section of gas piping and rigidly supported as shown at 25—24 in the posts. Connected to the gate 15, preferably to the end member thereof which is located nearest the post 10 when the gate is closed, is an eye bolt 26, the bolt being mounted for rotation in the gate and engaging around the rail 22, as shown. By this means the inner end of the gate is movably coupled to the rail, and constantly retained in position relative thereto during the opening and closing movement of the gate, as hereafter explained.

Pivotally connected at 27 to the gate 15 is a latch rod 28 having its free end directed downwardly at 29 and adapted to engage over a hooked keeper 30 upon the post 13. The rod 28 is provided intermediate its ends with a loop 31, and is held from lateral movement by a guide keeper 32 connected to the gate 15. Erected at opposite sides of the posts 10—11 and spaced therefrom are supporting posts 33—34, the post 33 carrying a cable guide sheave 35, while a similar guide sheave 36 is connected to the post 34. Connected to the transverse member 12 are guide sheaves 37—38.

Connected to the gate 15 is an eye 39, and connected to this eye is a short section of cable 40, and connected to the upper end of this cable section are two draw cables 41—42 leading respectively through the guide sheaves 37—38 and 35—36 and terminating in handles 43—44. The handles are preferably weighted sufficiently to maintain the draw cables in their stretched or taut condition. Connected at one end to the cable 40 at its juncture with the cables 41—42 is another section of draw cable 45, the lower end of the cable 45 being connected to the loop 31 of the latch bar 28. Connected to the eye 39 is another section of cable 46, and leading thence through a guide sheave 47 connected to the post 10 and terminating in a balance weight 48, the latter movable vertically alongside the post 10. Connected to the draw cable 46 is a stop or block device 49 adapted to engage against the sheave 47 when the gate is elevated, and thus limit the movement of the weight 48, as hereafter explained. Connected to the post 13 are stop devices, one of which is represented at 50, to prevent lateral movement of the gate 15 when the latter is in closed position.

With a device thus constructed the operation is as follows. Assuming that the gate is in closed position as shown in Fig. 1, when the driver approaches from either direction, he draws downwardly upon the draw cable 41 or 42 as the case may be by grasping the handle 43 or 44, this action resulting in first elevating the latch 28 and releasing it from the keeper 30 and then elevating the free end of the gate by means of the radius bars 17—19 and causing it to move longitudinally between the posts 10—11, this action causing the free end of the gate to be elevated into the position shown by dotted lines in Fig. 1 until the radius bars 17 pass the vertical line. The momentum of the gate causes the continued movement thereof and the gate will again fall into its horizontal position by gravity, the weight 48 causing the gate to move slowly into its open position. The eye bolt 26 operating over the horizontal rail 22 causes the upper end of the rear end of the gate to move constantly in horizontal position and prevents the rear end of the gate from dropping to the ground. The stop member 49 performs an important function in the operation, preventing the undue downward movement of the weight 48. As the driver passes through the gate he draws downwardly upon the other draw cable 41—42 as the case may be and thus reverses the movement and causes the gate to return to its former closed position.

The latch member 28 coacting with the keeper 30 operates effectually as a means for preventing hogs and other animals from opening the gate, as the gate must be moved longitudinally at the same time that it is elevated and this longitudinal movement of the gate cannot be accomplished so long as the latch member 28 remains in engagement with the keeper 30, as will be obvious. The latch member is thus a material and important feature of the improved device.

The improved device is simple in construction, can be inexpensively manufactured and applied to gates of various forms and sizes, and to gates erected in various localities, and may be constructed of any required material.

What is claimed is:—

The combination with guide posts and a gate movable between the same, a guide rail, an eye bolt mounted for rotation in said gate and slidably engaging said rail, radius bars pivoted at their ends respectively to said guide posts and to said gate, and draw cables connected to said gate and leading over guide devices carried by said posts.

In testimony whereof, I affix my signature, in presence of two witnesses.

FRANK E. QUIGLE.

Witnesses:
DAVID M. GARDINER,
ROSS KRUG.

H. J. REYNOLDS.
ENVELOP SEALING MACHINE.
APPLICATION FILED FEB. 26, 1909.

945,419.

Patented Jan. 4, 1910.
2 SHEETS—SHEET 1.

WITNESSES.

INVENTOR
H. J. REYNOLDS,
BY Fred. B. Fetherstonhaugh
ATTY.